(12) United States Patent
Pientka

(10) Patent No.: US 6,455,866 B1
(45) Date of Patent: Sep. 24, 2002

(54) SENSOR DEVICE FOR DETECTING MOISTURE ON A WINDOW

(75) Inventor: Rainer Pientka, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,490

(22) PCT Filed: Feb. 6, 1999

(86) PCT No.: PCT/DE99/00312

§ 371 (c)(1),
(2), (4) Date: Feb. 28, 2000

(87) PCT Pub. No.: WO99/52751

PCT Pub. Date: Oct. 21, 1999

(30) Foreign Application Priority Data

Apr. 8, 1998 (DE) .......................................... 198 15 747

(51) Int. Cl.⁷ ............................................... G01N 21/49
(52) U.S. Cl. .................... 250/574; 250/227.25; 318/483
(58) Field of Search ................................. 250/573, 574, 250/575, 227.25, 239, 216; 318/483, DIG. 2; 340/602, 603, 604

(56) References Cited

U.S. PATENT DOCUMENTS 5,661,303 A    8/1997  Teder
6,229,613 B1 *  5/2001  Hog et al. ............. 250/227.25

FOREIGN PATENT DOCUMENTS

DE    44 03 221    1/1995
DE    197 01 258   7/1997
FR    2 723 448    2/1996

* cited by examiner

Primary Examiner—Kevin Pyo
(74) Attorney, Agent, or Firm—Kenyon & Kenyon

(57) ABSTRACT

A sensor device is described for detecting wetting, in particular rainfall and soiling, on a windshield that has at least two, preferably eight, transmitters and at least one receiver for receiving light emitted by the respective transmitters. The at least two transmitters are arranged concentrically around the at least one receiver. A base area is defined by the at least two transmitters and the at least one receiver, with the base area being at least a sector of a circle. This reduces an outer dimension of the sensor device and improves a ratio of sensitive area to base area of the sensor device.

19 Claims, 2 Drawing Sheets

SENSOR DEVICE FOR DETECTING MOISTURE ON A WINDOW

FIELD OF THE INVENTION

The present invention relates to a sensor device for detecting wetting of a windshield.

BACKGROUND INFORMATION

German Patent No. 197 01 258 describes a sensor device that operates according to an optoelectronic principle for controlling wash/wipe systems for automotive windshields. The sensor device has multiple transmitters and at least one receiver for injecting and outputting via a coupling means a defined radiation into and out of the windshield whose wetting due to moisture or soiling is to be measured. The radiation is completely reflected at least once in the windshield on the (dry) surface of the windshield due to the injection angle and finally is outputted again to a receiver at a predetermined location. Total reflection is prevented by wetting of the surface of the windshield (air, water, ice, fog, soiling, etc.), resulting in wetting-dependent radiation losses due to output of a portion of the radiation from the original beam path, e.g., due to water droplets. The diminished radiation detected by the receiver is outputted as a sensor signal to a signal processing arrangement, where it is analyzed with regard to controlling a wash or wipe system for an automotive windshield, for example. A controller controls,the wiper motor in continuous or interval wiping mode as a function of the sensor signal mode analyzed.

According to German Patent No. 197 01 258 , the transmitters are arranged concentrically around the receiver on the coupling means or concentrically in sections, the coupling means having a circular or toroidal design. Thus, a circular base area is spanned by transmitters, receivers and coupling means. For this reason, the sensor, i.e., the sensor casing, is in the form of a round cylinder.

The sensitive area of the sensor is defined approximately by the sum of the measuring ranges of the windshield between a transmitter and the respective receiver, i.e., the one receiving the radiation. The measuring range is understood to be the range on the wettable side of the windshield within which the transmitter radiation is completely reflected in the absence of wetting, and therefore the transmitter radiation is outputted more or less in the measuring range because of wetting of the windshield.

One disadvantage here is the circular base area defined by the transmitters, receivers and coupling means and the round cylindrical sensor casing, leading to a relatively great extent of the sensor and its contact area on the windshield and therefore making the sensor noticeable and causing interference for the driver of the vehicle when it is mounted within the wiping area on the windshield, as is customary today.

Another disadvantage here is the small proportion of sensitive area relative to the base area of the sensor, i.e., its contact area. This is due to the fact that with a predetermined number of transmitters, e.g., eight, the non-sensitive areas between the transmitters arranged on the outer perimeter of the base area are large, usually larger than the sensitive areas.

This can be illustrated with an example. The circular base area spanned by the eight transmitters amounts to approx. 800 mm$^2$ with a radius r of 16 mm. Transmitters and receivers are mounted 3 mm, for example, above the windshield. The injection angle is 45° for a beam of light with a beam diameter of 5 mm. The eight individual sensitive areas between one sensor and one receiver are elliptical and yield a total sensitive area of approx. 55 mm$^2$. The ratio of the total sensitive area to the base area of the sensor is therefore calculated as being at most 6%.

To increase the sensitive area, a greater number of transmitters could be used. However, this would mean an increase in the cost of the sensor without eliminating the disadvantages of a great extent or a large contact area of the sensor.

SUMMARY OF THE INVENTION

The sensor device according to the present invention has the advantage that the base area spanned by the transmitter and receiver is not a full circle but instead is at least one sector of a circle. For example, the base area is defined by a semicircle or by two opposite sectors with a central angle of about 90 degrees.

In addition, the ratio of sensitive area to base area is improved, in particular doubled to 12% with a semicircle having the same number of transmitters, e.g., eight, and receivers. In other words, the existing base area is utilized optimally to measure the wetting.

Due to the reduced base area, the outer dimensions of the sensor on the windshield and thus its contact area are likewise reduced. It is especially advantageous that due to the non-circular base area, the outer dimensions of the sensor casing can be further reduced by selecting a contact area that is not circular but instead is quadrilateral, in particular rectangular, so that the base area can be arranged in the contact area with optimal utilization of the latter. In addition, a rectangular contact area, i.e., casing, is less expensive to manufacture.

In a first embodiment, the receivers are arranged within a rectangular contact area of the sensor device so that the transmitters are arranged on two sectors, with each sector corresponding to approximately one fourth of a circle with their apexes facing one another to form the center of the circle. The receiver is at the common center of the sectors, with the transmitters arranged equidistant from the receiver on the outer edge of the sectors. One advantage here is that the width of the rectangular base area corresponds only approximately to the radius. The length of the rectangular base area is obtained from twice the radius.

Another advantageous embodiment is obtained when the transmitters and receivers are arranged in a semicircle within this rectangular contact area of the sensor device. The transmitters are on the outer edge of a semicircular sector, and the receiver is arranged at the center of this sector. The width of the base area here again advantageously corresponds approximately to the radius of the sector, with the length of the base area corresponding to the diameter of the sector.

A third embodiment has two sectors (quarter circles) which are rotated by 180° relative to one another and are arranged side by side within the rectangular contact area. Two receivers are necessary for detecting the transmitter radiation.

Consequently, it is especially advantageous that the transmitters and receivers are arranged within the contact area of the sensor device, and the base area is selected with maximum utilization of the contact area, while at the same time the ratio of the sensitive area to the base area is also improved. Thus, an inexpensive sensor with small outside dimensions and at least uniform efficiency is obtained according to the present invention.

To further reduce the contact area of the sensor device, the distance from the transmitters to the receiver and thus the radius of the base area or the sector is minimized by the fact that the light emitted by the transmitters is subject to total reflection only on the outside of the windshield and then is output directly from the windshield to the receiver.

DETAILED DESCRIPTION

Figure 1:
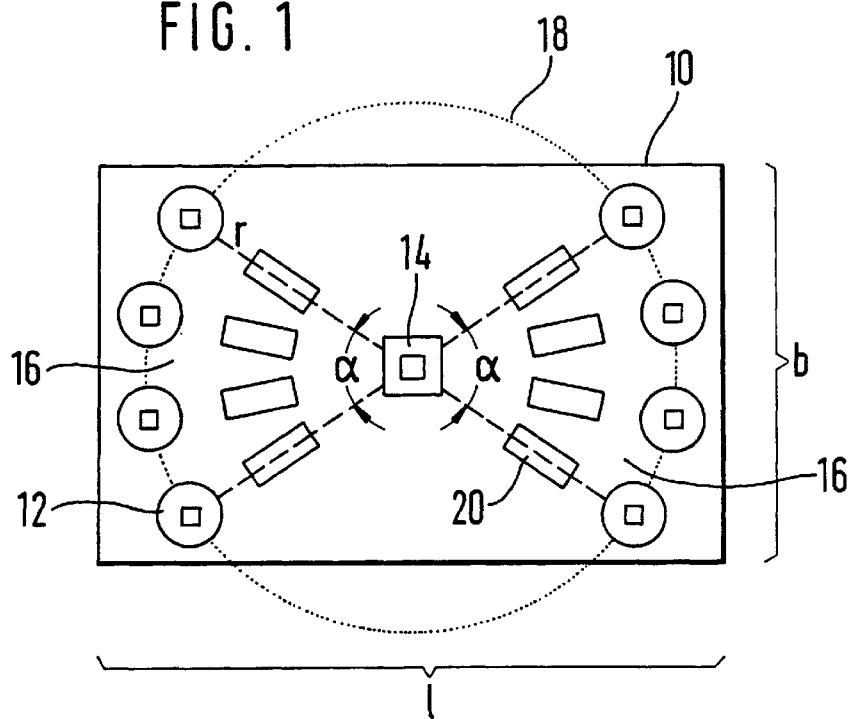
FIG. 1 shows a first embodiment of a sensor device according to the present invention.
Figure 2:
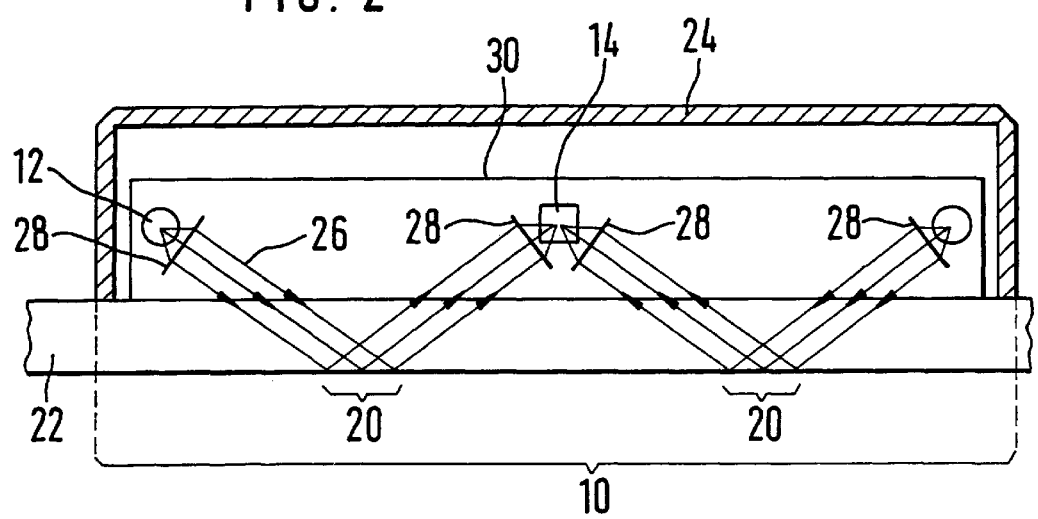
FIG. 2 shows a section of a sensor device according to the present invention.

FIGS. 1 and 2 show a sensor device having a rectangular contact area 10 with width b and length 1 of a sensor casing 24 on a windshield 22. Its contact area 10 is defined by contact of the sensor with windshield 22, for example. In general, however, the outside dimensions of contact area 10 correspond to the outside dimensions of the sensor device.

Thus, contact area 10, for example, is also a projection of the outside dimensions of sensor casing 24 with a front view of windshield 22. Therefore, as an alternative, sensor casing 24 may bulge over the contacted area of windshield 22, accommodating elements of the sensor within it.

The sensor device is mounted, for example, in the wiping area of a windshield wiper on the inside of an automotive windshield 22 or integrated into the base of a vehicle rearview mirror. Not shown here is the mounting of sensor casing 24 on windshield 22, e.g., by gluing.

Specifically, contact area 10 is defined by gluing a fiber optic body to the inside of the windshield, having the function of injecting light 26 emitted by a transmitter 12 into windshield 22 and outputting light 26 directed in windshield 22 by partial or total reflection to a receiver 14 at another predetermined location. This takes place at lenses 28, refractive surfaces or mirrors integrally molded in or on the fiber optic body to bundle, deflect or divert beams 26 in the desired direction.

Above contact area 10, i.e., the fiber optic body, eight light emitting transmitters 12 and one light detecting receiver 14 are mounted on an essentially conventional mounting device (not shown) within sensor casing 24. A circuit board 30 carrying the electronic components or a sensor control is often available as a mounting device for attachment of transmitters 12 and receiver 14. Transmitters 12 are preferably light emitting diodes (LEDs), receivers 14 are light receiving diodes (LRDs), with transmitter radiation 26 preferably being in the infrared range (IR) or in the visible range (VIS).

Receiver 14 is at the center of a circle 18 indicated with dotted lines, with transmitters 12 arranged concentrically with receiver 14 on the edge of the circle. Contact area 10 of the sensor device is selected here so that width b of contact area 10 is smaller than twice radius r of circle 18, and length 1 of contact area 10 is greater than twice the radius. Transmitters 12 and receiver 14 span a base area 16 of two sectors (indicated with dotted lines), each with its apex opposite the other and their center angles a amounting to approximately 90° or less.

Sensitive areas 20 illustrated here correspond to the areas on the wettable side of windshield 22 where there is total reflection of radiation 26 when windshield 22 is not wetted.

The extent of sensitive areas 20 will vary depending on the arrangement of transmitters 12 and receiver 14 relative to windshield 22, the thickness of windshield 22 and the diameter of transmitter beam 26.

Figure 3:
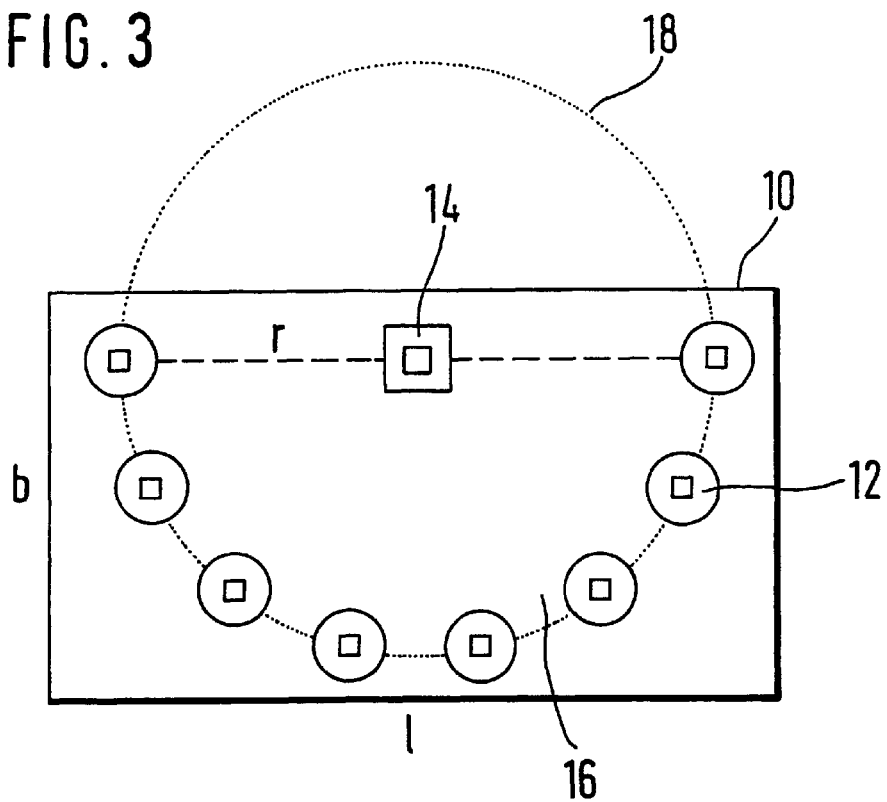
FIG. 3 shows a second embodiment of a sensor device according to the present invention.

FIG. 3 shows an alternative arrangement of transmitters 12 and receiver 14. Base area 16 spanned by transmitters 12 is a semicircle with radius r, with the eight transmitters 12 being distributed uniformly on the edge of the semicircle and receiver 14 forming the center of circle 18. Base area 16 spanned in this way may be arranged with optimal utilization of contact area 10 defined by sensor casing 24. In particular, width b and length 1 of contact area 10 correspond respectively to radius r and diameter 2r of circle 18.

Figure 4:
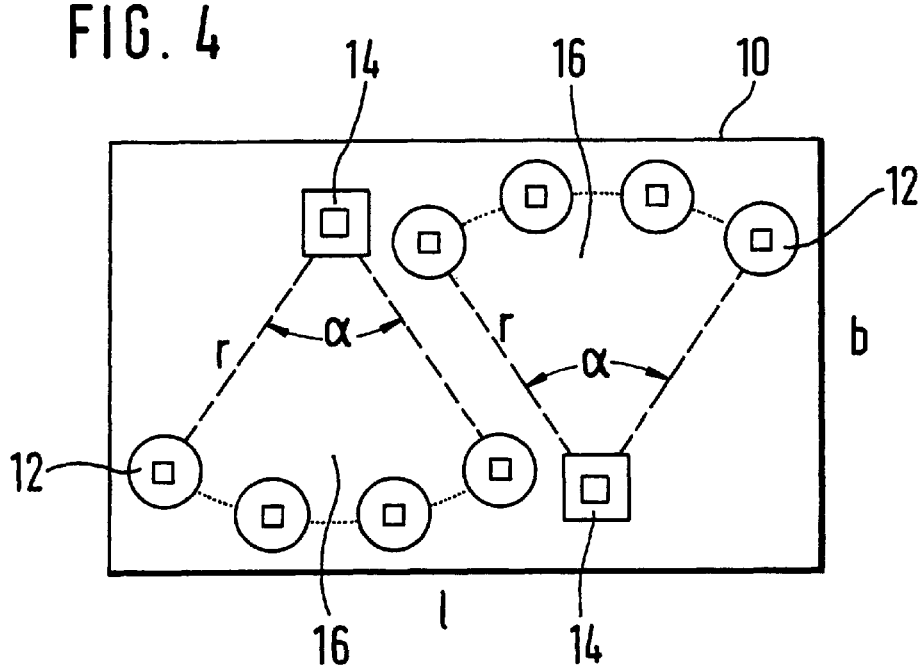
FIG. 4 shows a third embodiment of a sensor device according to the present invention.

FIG. 4 shows another arrangement of eight transmitters 12 and receivers 14 within same contact area 10. Both sectors are arranged so they are rotated by 180° relative to one another, so that two receivers 14 are now used. The sectors have same radius r and beam angle a according to FIG. 1. Base area 16 is defined by two sectors.

Distance r between transmitters 12 and respective receivers 14 is defined, inter alia, by the wavelength of the emitted radiation of transmitter 12, the thickness of windshield 22 and of the fiber optic body, the refractive index of windshield 22 as well as the angle of incidence and the point of incidence of radiation 26 into windshield 22 so that radiation 26 injected into windshield 22 is completely reflected only once at the surface of windshield 22, preferably on the outside of automotive windshield 22, and then guided out of windshield 22 to receiver 14. With more than the desired complete reflection on the wettable outside of windshield 22, distance r of transmitters 12 and receivers would be selected to be accordingly larger.

What is claimed is:

1. A sensor device for detecting wetting on a windshield, the wetting including at least one of rainfall and soil, the sensor device comprising:

at least two optical transmitters; and at least one optical receiver receiving a light emitted by the at least two optical transmitters, the at least two optical transmitters being arranged concentrically around the at least one optical receiver, a base area being defined by a projection of an arrangement of the at least two optical transmitters and the at least one optical receiver on a plane parallel to the windshield, the base area forming at least one sector of a circle but forming less than an entire circle, and wherein the at least two concentrically arranged optical transmitters are on the opposite sides of the at least one optical receiver.

2. The sensor device according to claim 1, wherein the at least two optical transmitters include eight optical transmitters.

3. A sensor device for detecting wetting on a windshield, the wetting including at least one of rainfall and soil, the sensor device comprising:

at least two optical transmitters;

at least one optical receiver receiving a light emitted by the at least two optical transmitters, the at least two optical transmitters being arranged concentrically around the at least one optical receiver, a base area being defined by a projection of an arrangement of the at least two optical transmitters and the at least one optical receiver on a plane parallel to the windshield, the base area forming at least one sector of a circle but forming less than an entire circle; and wherein the base area forms two sectors of the circle, the at least two optical transmitters being arranged on an edge of the two sectors and the at least one optical receiver being arranged at a center of the circle.

4. The sensor device according to claim 1, wherein the base area forms two sectors arranged side by side and rotated by 180 degrees relative to one another, the at least two optical transmitters being arranged on an edge of the two sectors and the at least one optical receiver including an optical receiver arranged at a center of each of the two sectors.

5. The sensor device according to claim 3, wherein each of the two sectors corresponds to approximately one fourth of the circle.

6. A sensor device for detecting wetting on a windshield, the wetting including at least one of rainfall and soil, the sensor device comprising:

at least two optical transmitters;

at least one optical receiver receiving a light emitted by the at least two optical transmitters, the at least two optical transmitters being arranged concentrically around the at least one optical receiver, a base area being defined by a projection of an arrangement of the at least two optical transmitters and the at least one optical receiver on a plane parallel to the windshield, the base area forming at least one sector of a circle but forming less than an entire circle; and wherein the at least two optical transmitters are arranged in a semicircle as the at least one sector of the circle with a common optical receiver of the at least one optical receiver arranged at a center of the circle.

7. The sensor device according to claim 1, further comprising:

a casing, a projection of the casing forming a quadrilateral contact area on the windshield, the at least two optical transmitters and the at least one optical receiver being arranged within the quadrilateral contact area with substantially maximum utilization of the quadrilateral contact area.

8. The sensor device according to claim 7, wherein the quadrilateral contact area is rectangular.

9. The sensor device according to claim 1, wherein a ratio of a sensitive area of the sensor device on the windshield to the base area is greater than 10 percent.

10. The sensor device according to claim 1, wherein a distance between the at least two optical transmitters and the at least one optical receiver receiving the emitted light is defined so that only total reflection of the emitted light occurs in the windshield.

11. The sensor device according to claim 1, wherein a distance between the at least two optical transmitters and the at least one receiver is equal.

12. The sensor device according to claim 10, wherein the at least two optical transmitters are arranged one of on and near an outer edge of the at least one sector at equal distances.

13. The sensor device according to claim 1, wherein mounting of the sensor device is one of inside of an automotive windshield or integrated into the base of a vehicle rearview mirror.

14. The sensor device according to claim 1, wherein the optical transmitter is a light emitting diode.

15. The sensor device according to claim 1, wherein the optical receiver is a light receiving diode.

16. The sensor device according to claim 1, wherein transmitter radiation is in one of infrared range or visible range.

17. The sensor device according to claim 1, wherein width of the base is smaller than twice the distance between the transmitter and the receiver.

18. The sensor device according to claim 1, wherein length of the base is greater than twice the distance between the transmitter and the receiver.

19. The sensor device according to claim 1, wherein a center angle α formed between the at least two optical transmitters and the at least one receiver is approximately 90° or less.

* * * * *